United States Patent
Kageyama

(10) Patent No.: US 9,982,144 B2
(45) Date of Patent: May 29, 2018

(54) SILVER-COATED CONDUCTIVE PARTICLES, CONDUCTIVE PASTE AND CONDUCTIVE FILM

(71) Applicant: Mitsubishi Materials Electronic Chemicals Co., Ltd., Akita (JP)

(72) Inventor: Kensuke Kageyama, Akita (JP)

(73) Assignee: MITSUBISHI MATERIALS ELECTRONIC CHEMICALS CO., LTD., Akita (JP)

(*) Notice: Subject to any disclaimer, the term of this patent is extended or adjusted under 35 U.S.C. 154(b) by 51 days.

(21) Appl. No.: 15/100,588

(22) PCT Filed: Dec. 19, 2014

(86) PCT No.: PCT/JP2014/083714
§ 371 (c)(1),
(2) Date: May 31, 2016

(87) PCT Pub. No.: WO2015/093597
PCT Pub. Date: Jun. 25, 2015

(65) Prior Publication Data
US 2016/0304728 A1    Oct. 20, 2016

(30) Foreign Application Priority Data
Dec. 20, 2013    (JP) ................. 2013-264691

(51) Int. Cl.
*H01B 1/02*    (2006.01)
*C09D 5/24*    (2006.01)
(Continued)

(52) U.S. Cl.
CPC ............ *C09D 5/24* (2013.01); *C08J 3/128* (2013.01); *C08K 9/10* (2013.01); *C09D 7/40* (2018.01);
(Continued)

(58) Field of Classification Search
CPC ............ C08J 2325/06; C08J 2333/00; C08J 2361/06; C08J 3/128; C08K 2201/001;
(Continued)

(56) References Cited

U.S. PATENT DOCUMENTS 9,093,192 B2    7/2015  Nakabayashi et al.
2008/0078977 A1*  4/2008  Hashiba ............ C08J 3/12
                                                   252/500
(Continued)

FOREIGN PATENT DOCUMENTS

JP    02-118079 A    5/1990
JP    08-311655 A    11/1996
(Continued)

OTHER PUBLICATIONS

International Search Report dated Mar. 10, 2015 for the corresponding PCT Application No. PCT/JP2014/083714.

*Primary Examiner* — Mark Kopec
*Assistant Examiner* — Jaison P Thomas
(74) *Attorney, Agent, or Firm* — Leason Ellis LLP

(57) ABSTRACT

Provided are highly reliable silver-coated conductive particles, which are prevented from an occurrence of migration, the silver-coated conductive particles in which: a tin layer is formed on a surface of each spherical base particle, and a silver plating layer is formed on a surface of the tin layer, and a surface of the silver plating layer is coated with a water repellent layer: the water repellent layer includes an organic sulfur compound that is mainly composed of a sulfide compound or a surfactant such as polyoxyethylene ethers: and a molded body that is formed by pressing the silver-coated conductive particles at a pressure of 14.7 MPa has a contact angle with water of 125 degree or more.

9 Claims, 1 Drawing Sheet

(51) Int. Cl.
- C09D 11/52 (2014.01)
- C09J 9/02 (2006.01)
- C09J 11/00 (2006.01)
- C09J 201/00 (2006.01)
- C23C 18/16 (2006.01)
- C23C 18/31 (2006.01)
- C23C 18/44 (2006.01)
- H01B 1/22 (2006.01)
- C23C 18/42 (2006.01)
- C23C 18/52 (2006.01)
- C08J 3/12 (2006.01)
- C08K 9/10 (2006.01)
- C09D 163/00 (2006.01)
- C09J 11/06 (2006.01)
- C09J 11/08 (2006.01)
- C09J 7/00 (2018.01)
- C09J 11/04 (2006.01)

(52) U.S. Cl.
CPC ............. *C09D 7/63* (2018.01); *C09D 7/65* (2018.01); *C09D 7/69* (2018.01); *C09D 7/70* (2018.01); *C09D 11/52* (2013.01); *C09D 163/00* (2013.01); *C09J 7/00* (2013.01); *C09J 9/02* (2013.01); *C09J 11/00* (2013.01); *C09J 11/04* (2013.01); *C09J 11/06* (2013.01); *C09J 11/08* (2013.01); *C09J 201/00* (2013.01); *C23C 18/16* (2013.01); *C23C 18/165* (2013.01); *C23C 18/1633* (2013.01); *C23C 18/1641* (2013.01); *C23C 18/31* (2013.01); *C23C 18/42* (2013.01); *C23C 18/44* (2013.01); *C23C 18/52* (2013.01); *H01B 1/02* (2013.01); *H01B 1/22* (2013.01); *C08J 2325/06* (2013.01); *C08J 2333/00* (2013.01); *C08J 2361/06* (2013.01); *C08K 2201/001* (2013.01); *C09J 2203/318* (2013.01)

(58) Field of Classification Search
CPC ........ C08K 9/10; C09D 11/52; C09D 163/00; C09D 5/24; C09D 7/12; C09D 7/1233; C09D 7/125; C09D 7/1283; C09D 7/1291; C09J 11/00; C09J 11/04; C09J 11/06; C09J 11/08; C09J 201/00; C09J 2203/318; C09J 7/00; C09J 9/02; C23C 18/16; C23C 18/1633; C23C 18/1641; C23C 18/165; C23C 18/31; C23C 18/42; C23C 18/44; C23C 18/52; H01B 1/02; H01B 1/22
See application file for complete search history.

(56) References Cited

U.S. PATENT DOCUMENTS

2012/0241687 A1* 9/2012 Wu ..................... B05D 5/083
  252/511
2013/0140501 A1* 6/2013 Nakabayashi ...... C23C 18/1641
  252/514

FOREIGN PATENT DOCUMENTS

| | | | |
|---|---|---|---|
| JP | 2004-156062 | A | 6/2004 |
| JP | 2007-242307 | A | 9/2007 |
| JP | 2011-150975 | A | 8/2011 |
| JP | 2013105535 | A * | 5/2013 |
| WO | WO-2012/023566 | A | 2/2012 |

* cited by examiner

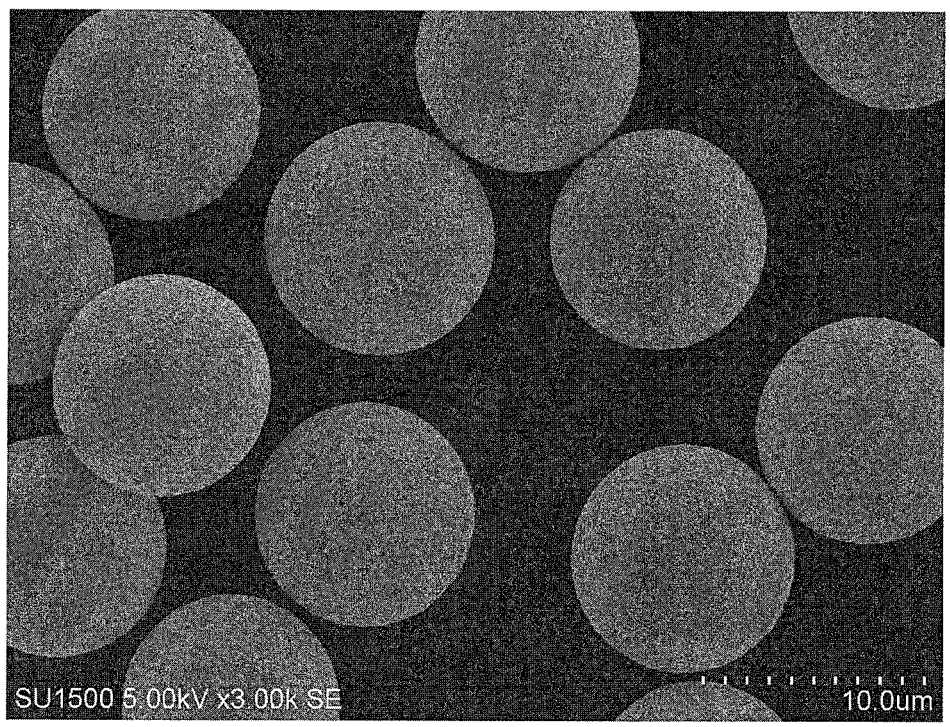

SILVER-COATED CONDUCTIVE PARTICLES, CONDUCTIVE PASTE AND CONDUCTIVE FILM

CROSS-REFERENCE TO RELATED PATENT APPLICATIONS

This application is a U.S. National Phase Application under 35 U.S.C. § 371 of International Patent Application No. PCT/JP2014/083714, filed Dec. 19, 2014, and claims the benefit of Japanese Patent Applications No. 2013-264691, filed Dec. 20, 2013, all of which are incorporated herein by reference in their entireties. The International Application was published in Japanese on Jun. 25, 2015 as International Publication No. WO/2015/093597 under PCT Article 21(2).

BACKGROUND OF THE INVENTION

Technical Field

The present invention relates to a silver-coated conductive particles for anisotropic conductive film, anisotropic conductive paste, isotropic conductive paste and the like, and conductive paste and conductive film using the silver-coated conductive particles.

Background Art

As conductive particles for anisotropic conductive film (ACF) and anisotropic conductive paste (ACP), which are used in a liquid crystal display, a touchscreen panel or the like, there are resin particles of acryl, urethane, styrene or the like with plating of Ni, Au, or Ag.

Ag-plated resin balls can be used for the anisotropic conductive film, and can replace conductive particles in conventional isotropic conductive paste. Herewith, it is expected to reduce costs (i.e., volume is reduced to one fifth by difference in specific gravity) and to improve a handling property.

As the conductive particles above, Patent Document 1 discloses one that is manufactured by plating base particles with nickel as an undercoat and furthermore with silver. Patent Document 2 discloses one that is manufactured by plating resin powder with nickel as an undercoat and furthermore with gold, instead of silver. Especially, the one that is two-layer coated with Ni/Au is used in general as a bonding material of the anisotropic conductive such as the liquid crystal panel, the touchscreen panel, and the like.

Patent Document 3 discloses an electroless plating method of spherical crosslinked polystyrene resin or phenol resin with silver. In this electroless plating, a tin coat is formed on a surface of the spherical resin by a stannous chloride-hydrochloric acid solution; and then a silver coat is formed on the tin coat.

When it is used as conductive filler for a conductive spacer, a deformation property of filler at a pressing load on the filler and a recovery factor when the pressing load is released are required. It was required for the conductive particles described in Patent Documents 1 to 3 to improve the deformation property and the recovery factor of the filler.

Accordingly, in Patent Document 4, the present applicant suggested one that has silver-coated spherical resin having an appropriate deformation property and a recovery factor of filler and excellent conductivity, which is provided with spherical resin, a tin layer formed on a surface of the spherical resin, and silver coated on a surface of the tin layer; with an amount of silver of 2 to 80 parts by mass for 100 parts by mass of the silver-coated spherical resin, and a crystallite diameter of silver is measured at 18 to 24 nm by X-ray diffraction analysis.

CITATION LIST

Patent Literature

Patent Document 1: Unexamined Japanese Patent Application, First Publication No. 2007-242307
Patent Document 2: Unexamined Japanese Patent Application, First Publication No. H08-311655
Patent Document 3: Unexamined Japanese Patent Application, First Publication No. H02-118079
Patent Document 4: Specification of International Publication No. 2012/023566

Technical Problem

Silver has high conductivity and is advantageous in regards to cost compared with gold. However, a short-circuit is easy to be occurred by ion migration; so that reliability is required to be improved.

The present invention is achieved in consideration of the above circumstances, and has an object to provide silver-coated conductive particles preventing migration and having high reliability, and conductive paste and conductive film using the silver-coated conductive particles.

SUMMARY OF THE INVENTION

Solution to Problem

Silver-coated conductive particles according to the present invention are characterized in that a tin layer is formed on a surface of each spherical base particle, a silver plating layer is formed on a surface of the tin layer, and a surface of the silver plating layer is coated with a water repellent layer.

By forming the silver plating layers as undercoating layers on the base particles with intervening the tin layers therebetween, it is possible to form the dense silver plating layers having an excellent adhesiveness though the particles are spherical. Moreover, by forming the water repellent layers on the surfaces of the silver plating layers, ionization by water adsorption can be reduced and the migration can be prevented from occurring.

In this case, it is preferable that a molded body made by pressing the silver-coated conductive particles according to the present invention at a pressure of 14.7 MPa have a contact angle with water of 125 degree or more.

In the silver-coated conductive particles according to the present invention, it is preferable that the water repellent layers include an organic sulfur compound or a surfactant.

It is preferable that the organic sulfur compound include a sulfide compound as a main ingredient. It is more desirable that it is dialkyl sulfide.

It is preferable that the surfactant be polyoxyethylene ethers.

It is preferable that diameters of the silver-coated conductive particles of the present invention be 0.5 µm or more and 30 µm or less.

It is preferable that material of the base particles be one selected from acrylic resin, urethane resin, styrene resin, phenolic resin, silica, or alumina.

The present invention provides a conductive paste including the above silver-coated conductive particles, or a conductive film including the silver-coated conductive particles.

Advantageous Effects of Invention

According to the silver-coated conductive particles of the present invention, since the surfaces have water repellency, it is possible to reduce insulation failure owing to the migration in conductive film using them. Accordingly, it is possible to form a conductive film having high long-term reliability.

BRIEF DESCRIPTION OF THE DRAWINGS

FIG. 1 is a scanning electron micrograph of silver-coated conductive particles of Example 1.

DETAILED DESCRIPTION OF THE INVENTION

Below, an embodiment of the silver-coated conductive particles of the present invention will be explained.

(Silver-Coated Conductive Particles)

The silver-coated conductive particles of the present embodiment are provided with: spherical base particles; tin layers formed on surfaces of the base particles; silver plating layers coating surfaces of the tin layers; and water repellent layers formed on surfaces of the silver plating layers. Silver content in the silver-coated conductive particles is 25 mass % or more and 83 mass % or less. A crystallite diameter of silver measured by X-ray diffraction analysis is 18 nm or more and 24 nm or less. A molded body made by pressing the silver-coated conductive particles at a pressure of 14.7 MPa (150 kg/cm$^2$) has a contact angle with water of 125 degree or more.

The base particles may be substantially spherical particles; for example, proper spherical particles, particles having a nearly spherical shape like an oval, or particles with slight unevenness at surfaces thereof can be included. It is more desirable that the base particles have the more spherical shape. In a case in which the base particles have a sharp protrusion, adhesiveness of plating coats may be deteriorated, dispersiveness may be declined, and it may cause deterioration in repeatability of giving conductivity or the like when the silver-coated conductive particles are used as conductive filler. Accordingly, the shape having the sharp protrusion is not favorable. A preferable range of ratio of a major axis and a minor axis of the base particles is 1 or more and 1.5 or less; more preferable range is 1 or more and 1.3 or less, and a most preferable range is 1 or more and 1.1 or less.

As the base particles, one of acrylic resin, styrene resin, urethane resin, phenolic resin, silica, or alumina can be used.

In a case in which the silver-coated conductive particles are used for an anisotropic conductive adhesive agent, anisotropic conductive film or the like, in view of properties which are required for the anisotropic conductive adhesive agent, the anisotropic conductive film or the like (i.e., a deformation property of filler at a pressing load on the filler, and a recovery factor when the pressing load is released), it is desirable that the base particles be made of acrylic resin or styrene resin. Acrylic resin may be methyl methacrylate resin (PMMA resin) or the like. Styrene resin may be polystyrene resin (PS resin) or the like.

It is preferable that an average diameter of the base particles be 0.5 to 30 μm. It is preferable that diameters of the base particles be not varied and a variation coefficient thereof be 5.0% or less. If the average diameter of the base particles is smaller than 0.5 μm, area of the surfaces of the base particles is large, so it is necessary to increase the silver content in order to obtain conductivity necessary for the conductive filler. If the average diameter of the base particles is larger than 30 μm, it is difficult to apply the silver-coated conductive particles to a minute pattern. If the diameters of the base particles are varied, it may cause the deterioration in the repeatability of giving conductivity or the like when used as the conductive filler. Therefore, it is more preferable that the diameters of the silver-coated conductive particles be not varied and the variation coefficient thereof be 5.0% or less.

An average diameter of particles is obtained by a following method. Using a scanning electron microscope made by Hitachi High-Technologies Corporation (model number: SU-1500) and software (article name: PC SEM), diameters of 300 spherical resin particles (the base particles) are measured at a magnification of 2,000. The average diameter of particles is obtained by calculating an average of the measured values. A variation coefficient (a CV value, a unit "%") is obtained from the diameters of the 300 particles by a formula of {(a standard deviation/the average diameter)× 100}.

On the surfaces of the base particles, the silver plating layers are formed with intervening the tin layers, and the water repellent layers are formed on the surfaces of the silver plating layers.

The tin layers include divalent ions of tin in a tin compound used for a pretreatment stated below. In the pretreatment, the tin layers are formed by the divalent ions of tin adhering on the surfaces of the base particles.

Generally, when electroless plating is performed on a surface of a non-conductor such as organic material or inorganic material, it is necessary to perform a catalyst-formation treatment on the surface of the non-conductor beforehand. In the present embodiment, by performing the catalyst-formation treatment (i.e., a pretreatment), the tin layers are formed on the surfaces of the base particles, so the electroless plating stated below can be performed and the silver plating layers having following properties can be formed.

A crystallite diameter of silver is an average value of crystallite diameters of a (111) surface, a (200) surface, a (220) surface and a (311) surface obtained by the Debye-Scherrer method of X-ray diffraction by a CuKα ray. If the crystallite diameter of silver is smaller than 18 nm, crystal grains of silver condense, so that dense silver coats cannot be obtained: accordingly, adhesiveness of silver to the base particles is deteriorated. If the crystallite diameter of silver is larger than 24 nm, crystal grains of silver are rough, so that dense silver coats cannot be obtained: accordingly, adhesiveness of silver to the base particles is deteriorated.

The water repellent layers include an organic sulfur compound or a surfactant, and are made by immersing particles on which the silver plating layers are formed into a solution including the organic sulfur compound or the surfactant, stirring, mixing and drying them as described later.

The water repellency of the silver-coated conductive particles formed as above is specified by the contact angle with water. Specifically, the contact angle with water is obtained by a drop of water dropped on a surface of a molded body, which is made into a pellet shape by filling a lot of silver-coated conductive particles in a die and pressing at 14.7 MPa (150 kg/cm$^2$). The contact angle with water of the silver-coated conductive particles of the present embodiment is 125 degree or more. If the contact angle is less than 125 degree, it is ionized by adsorbing moisture from environmental atmosphere, so that the migration is easily occurred.

The silver content in the silver-coated conductive particles is 25 mass % or more and 83 mass % or less, which is determined from the average diameter of the base particles and desired conductivity.

If the silver content in the silver-coated conductive particles is less than 25 mass %, it is difficult for the silver-coated conductive particles to contact with each other at silver thereof when dispersed as the conductive filler, so that it is not possible to get enough conductivity. On the other hand, if the silver content is more than 83 mass %, specific gravity is large and the conductivity is saturated despite the cost is increased.

As to the conductivity of the silver-coated conductive particles of the present embodiment, it is preferable that a powder volume resistivity be $1\times10^{-2}$ $\Omega\cdot$cm or less, and further preferably $3\times10^{-3}$ $\Omega\cdot$cm or less. If the powder volume resistivity is more than $1\times10^{-2}$ $\Omega\cdot$cm, it is not suitable for conductive material since a resistance value is high. Here, the powder volume resistivity is a value measured by a following method: a green compact is made by pressing the silver-coated conductive particles at a pressure of 9.8 MPa in a pressure vessel, and a resistance value of this green compact is measured by a digital multi-meter.

When one of the silver-coated conductive particles is compressed to reduce the grain diameter at 20% in one direction, it is preferable that a resistance value in the compression direction be 100$\Omega$ or less.

When one of the silver-coated conductive particles is compressed to reduce the grain diameter at 50% in one direction, it is preferable that a resistance value in the compression direction be 10$\Omega$ or less.

The silver-coated conductive particles of the present embodiment are superior conductive filler, and are most applicable to an anisotropic conductive adhesive agent, an anisotropic conductive film, or a conductive spacer.

(Anisotropic Conductive Adhesive Agent, Anisotropic Conductive Film, and Conductive Spacer)

The anisotropic conductive adhesive agent and the anisotropic conductive film include insulating binder resin and conductive minute particles dispersed in the insulating binder resin. In the present embodiment, as the conductive minute particles, the silver-coated conductive particles of the present embodiment are contained. A content of the silver-coated conductive particles is not specified but suitably determined in accordance with a purpose and the like: however, it is preferable to be 0.5% or more and 5% or less.

As the anisotropic conductive adhesive agent, for example, anisotropic conductive paste, anisotropic conductive ink or the like can be used. In the present embodiment, as the conductive minute particles, the silver-coated conductive particles of the present embodiment are contained. In a case of the anisotropic conductive adhesive agent, insulating binder resin is not specifically limited, and may be thermoplastic resin, compound which is curable by heat or light, or the like, for example. As the thermoplastic resin, styrene-butadiene block copolymer, acrylate resin, ethylene-vinyl acetate resin or the like can be used. As the curable resin composition, resin composition including monomer or oligomer having glycidyl group and curative agent such as isocyanate can be used.

The anisotropic conductive film is made to have a film-shape by a following method, for example: a composition in which the conductive minute particles are dispersed in insulating binder resin is made, and this composition is spread on a surface of a support film such as PET: so that the anisotropic conductive film is obtained. In a case of the anisotropic conductive film, the insulating binder resin is resin composition including thermosetting resin such as epoxy resin, phenoxy resin or the like as main ingredients.

The conductive spacer is made of the silver-coated conductive particles of the present embodiment. In a liquid crystal display including two substrates vertically stacked so as to interpose liquid crystal material, the conductive spacer electrically connects wiring parts of the substrates and maintains a gap between the substrates to a desired size. For example, resin composition is made by adding the conductive spacer to thermosetting resin or ultraviolet-curing adhesive agent. Then, the resin composition is spread on the wiring parts of the vertically-stacked two substrates so as to paste together. A content of the conductive spacer (the silver-coated conductive particles) in the resin composition is not specifically limited but suitably determined in accordance with a purpose or the like: however, it is preferable to be about 2% or more and 10% or less.

(Manufacturing Method of Silver-Coated Conductive Particles)

A manufacturing method of the silver-coated conductive particles of the present embodiment includes: a process performing a pretreatment on the base particles by a water solution of tin compound (a forming process of the tin layer); a process performing electroless silver plating on the pretreated base particles by a reducing agent (a forming process of the silver plating layer); and a process forming the water repellent layers on the particles in which the silver plating layers are formed (a forming process of the water repellent layer).

((Forming Process of Tin Layer))

In the pretreatment forming the tin layers on the base particles, for example, the base particles are added to the water solution of tin compound, and are stirred. Then, the base particles are separated by filtering and washed with water. Duration for stirring is appropriately determined in accordance with following temperature of the water solution of tin compound and a content of the tin compound; it is preferable to be 0.5 hour or more and 24 hours or less.

The temperature of the water solution of tin compound is 20° C. or higher and 45° C. or lower; preferably 20° C. or higher and 35° C. or lower; more preferably 25° C. or higher and 35° C. or lower; and most preferably 27° C. or higher and 35° C. or lower. If the temperature of the water solution of tin compound is lower than 20° C., activity of the water solution is decreased by decreasing of temperature, the tin compound is not enough adhered on the base particles. On the other hand, if the temperature of the water solution of tin compound is higher than 45° C., since the tin compound is oxidized and the water solution becomes unstable, the tin compound is not enough adhered on the base particles. By carrying out this pretreatment process in the water solution with temperature of 20° C. or higher and 45° C. or lower, for minute particles of acrylic resin or styrene resin, even though they have low adhesiveness by a conventional method, it is possible to deposit crystal grains of silver having a suitable crystallite diameter. Accordingly, it is possible to form silver plating layers having excellent adhesiveness and density. Moreover, since the silver plating layers have the excellent adhesiveness and the density, a resistance value in a compression direction when it is compressed to reduce the grain diameter at 10% can be reduced to one-tenth or less comparing to conventional one.

As tin compound used in the pretreatment, stannous chloride, stannous fluoride, stannous bromide, and stannous iodide and the like can be used. In a case in which stannous chloride is used, it is preferable that a stannous fluoride content in the water solution of tin compound be 30 g/dm$^3$ or more and 100 g/dm$^3$. If the stannous chloride content is 20 g/dm$^3$ or more, it is easy to form an even tin layer. If the stannous chloride content is 100 g/dm$^3$ or less, it is easy to reduce an inevitable-impurities content in the stannous chloride. Stannous chloride can be contained in the water solution of tin compound until to be saturated.

It is preferable that the water solution of tin compound include 0.5 cm$^3$ or more and 2 cm$^3$ or less of hydrochloric acid for a 1 g of stannous chloride. If the hydrochloric acid content is 0.5 cm$^3$ or more, solubility of the stannous chloride is improved, and tin can be prevented from being hydrolyzed. If the hydrochloric acid content is 2 cm$^3$ or less, tin can be efficiently adsorbed to the spherical resin because a pH value of the water solution of tin compound is not excessively low.

((Forming Process of Silver Plating Layer))

The silver plating layer is formed by an electroless plating method. As the electroless plating method, any of following methods can be used.

(1) a method of immersing the pretreated base particles in water solution including a complexing agent, a reducing agent and the like, and dropping the water solution of silver salt, (2) a method of immersing the pretreated base particles in water solution including silver salt and a complexing agent, and dropping water solution of caustic alkaline, and (3) a method of immersing the pretreated base particles in water solution including silver salt, a complexing agent, a reducing agent and the like, and dropping water solution of caustic alkaline.

As the silver salt, silver nitrate, one in which silver is solved in nitric acid, or the like can be used. As the complexing agent, ammonia, salts such as ethylenediaminetetraacetic acid, ethylenediaminetetraacetic acid tetrasodium, nitrilotriacetic acid, triethylenetetraminehexaacetic acid or the like can be used. As the reducing agent, formalin, dextrose, rochelle salt (potassium sodium tartrate), hydrazine, a derivative of hydrazine, or the like can be used. As the reducing agent, formaldehyde is suitable; a mixture of two or more reducing agents, at least formaldehyde, is more suitable; and a mixture of the reducing agents of formaldehyde and dextrose is most suitable.

((Forming Process of Water Repellent Layer))

As a forming method of the water repellent layer, particles in which the silver plating layers are formed thereon are immersed in a solution including organic sulfur compound or a surfactant, and stirred, mixed, and dried.

As the organic sulfur compound, sulfide compound such as dioctadecyl sulfide is suitable; and an addition agent such as polyethylene glycol or the like is added to water solution of it.

The water solution includes 2% or more and 4% or less of the sulfide compound, and 1% or more and 2% or less of the addition agent by mass %. It is preferable that immersing duration be 5 minutes or more and 60 minutes or less, and temperature of the water solution be 20° C. or higher and 60° C. or lower.

As the sulfide compound, followings can be used: straight-chain or branched-chain dialkyl sulfide (alkyl sulfide) having a carbon number of about 6 to 40 (preferably a carbon number of about 10 to 40) such as dihexyl sulfide (a melting point: 260° C.), diheptyl sulfide (a melting point: 298° C.), dioctyl sulfide (a melting point: 309° C.), didecyl sulfide (a melting point: 217° C./8 mmHg), didodecyl sulfide, ditetradecyl sulfide, dihexadecyl sulfide, dioctadecyl sulfide or the like; aromatic sulfide having a carbon number of about 12 to 30 such as diphenyl sulfide (a melting point: 296° C.), phenyl p-tolyl sulfide (a melting point: 312° C.), 4,4-thiobis-benzenethiol (a melting point 148° C./12 mmHg) or the like; thiodicarboxylic acid such as 3,3'-thiodipropionic acid (a melting point: 409° C.), 4,4'-thiodibutanoic acid, or the like. Among these, dialkyl sulfide is suitable.

As the addition agent, polyethylene glycol, sodium dodecyl sulfate, sodium lauryl sulfate or the like can be used.

As a solution including a surfactant, water solution of a surfactant having a rust prevention function in which the addition agent is added is used.

The water solution includes 2% or more and 4% or less by mass of the surfactant and 1% or more and 2% or less by mass of the addition agent. It is preferable that the immersing duration be 5 minutes or more and 60 minutes or less, and the temperature of the water solution be 20° C. or higher and 60° C. or lower.

The surfactant is not limited; for example, alcohols, acids, and ethers: e.g., polyvinyl alcohol, polyacrylic acid, methalose, methyl cellulose, ethyl cellulose, propyl cellulose, hydroxyethyl cellulose, carboxymethyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkyl phenoxy poly (ethyleneoxy) ethanol, or combination of these can be used.

As the addition agent, polyethylene glycol, sodium dodecyl sulfate, sodium lauryl sulfate or the like can be used.

Other than the above-mentioned organic sulfur compound or the surfactant with the rust prevention function, it is applicable if adsorptivity to Ag is excellent and the water repellency can be given: for example, a silane coupling agent, a fluorine-containing polymer compound or the like.

EXAMPLES

Example 1

Particles of acrylic resin having a median size of 20 μm were used as the base particles. As a pretreatment, stannous chloride: 15 g and 35% hydrochloric acid: 15 cm$^3$ were diluted to 1 dm$^3$ total by water in a measuring flask of 1 dm$^3$; and the base particles 50 g were added and stirred for 1 hour in a state of being kept at 25° C. Then, the base particles were separated by filtering and washed with water.

A water solution including a complexing agent and a reducing agent was made by dissolving tetrasodium ethylenediaminetetraacetate (the complexing agent): 10.7 g, sodium hydroxide: 2.5 g, and formalin (the reducing agent): 5 cm$^3$ in water: 2 dm$^3$. Water solution including silver nitrate was made by mixing silver nitrate: 1.7 g, 25% ammonia water: 2 cm$^3$, and water: 100 cm$^3$.

In the water solution including the complexing agent and the reducing agent, the base particles after the pretreatment were immersed. Then, while stirring the water solution, the water solution including silver nitrate was dripped with spending 60 minutes, silver-coated particles, in which silver of concentration of 30 mass % was coated at a film thickness of 0.2 μm on the base particles, were finally made. Then, the silver-coated particles were washed by water and dried.

Next, the water repellent layers were made by stirring the silver-coated particles in water solution including dioctadecyl sulfide 4% and polyethylene glycol 1% at 40° C. for 20 minutes and then drying.

Obtained powder was pressed at a pressure of 14.7 MPa (150 kg/cm$^2$) so as to form a molded body. A contact angle with water of the molded body was measured 130 degree by using a contact angle gauge made by Kyowa Interface Science Co., LTD.

Next, epoxy resin: 100 parts by mass, an amine curing agent: 150 parts by mass, and toluene: 70 parts by mass were mixed, so that an insulating adhesive agent were prepared. Combining the silver-coated conductive particles: 15 parts, so that paste was obtained. By screen printing of this paste, an interdigitated array electrode of L & S 0.3 mm (both a width and a gap of electrode wires were 0.3 mm) was printed, so that a migration was judged.

The migration was judged by an insulation property for 500 hours under an atmosphere of 80° C. and 95% humidity, and an insulation property for 800 hours under the same condition, using a migration measuring device AMI-U made by Espec Corporation. If the insulation property was maintained after 500 hours or 800 hours, it was judged to be "good"; or electrical breakdown was occurred and resulting in a short-circuit, it was judged to be "bad".

Comparative Example 1

A molded body was made from silver-coated conductive particles formed as the Example 1 other than without forming the water repellent layers, by pressing at a pressure of 14.7 MPa. A contact angle with water of the molded body was 120 degree measured by the contact angle gauge made by Kyowa Interface Science Co., LTD.

Interdigitated array electrodes of L & S 0.3 mm were drawn by paste made from the same ingredients as Example 1. Judging migration, they were conducted after 200 hours and resulted in insulating failure.

Examples 2 to 13

Examples 2 to 13 were made under different forming conditions of the base particles, the silver plating and the water repellent layers than Example 1.

Comparative Examples 2 and 3

Comparative Examples 2 and 3 were made from the base particles with different diameter, different thickness and different concentration of the silver plating than Comparative Example 1.

Table 1 shows manufacturing conditions and evaluation results of Examples and Comparative Examples.

TABLE 1

| | Base Particles | | Silver-Plating Layer | | | Forming Process of Water Repellent Layer | | Powder Property | Evaluation of Migration Insulation Property | |
|---|---|---|---|---|---|---|---|---|---|---|
| | Type | Diameter μm | Thickness μm | Concentration mass % | | Main Ingredient | Addition Agent | Contact Angle with | (after 500 hr) | (after 800 hr) |
| EXAMPLES | acryl | 20 | 0.20 | 30 | | dioctadecyl sulfide | polyethylene glycol | 130° | good | bad |
| | acryl | 15 | 0.15 | 40 | | dihexadecyl sulfide | polyethylene glycol | 140° | good | good |
| | acryl | 10 | 0.15 | 45 | | ditetradecyl sulfide | sodium dodecyl sulfate | 132° | good | bad |
| | acryl | 10 | 0.15 | 45 | | diphenyl sulfide | polyethylene glycol | 141° | good | good |
| | acryl | 1 | 0.12 | 83 | | dioctadecyl sulfide | polyethylene glycol | 140° | good | good |
| | acryl | 30 | 0.20 | 25 | | dioctadecyl sulfide | polyethylene glycol | 145° | good | good |
| | acryl | 20 | 0.20 | 30 | | polyoxyethylene octylphenyl ether | sodium dodecyl sulfate | 140° | good | good |
| | acryl | 15 | 0.15 | 40 | | polyoxyethylene alkyl allyl ether | sodium dodecyl sulfate | 132° | good | bad |
| | acryl | 10 | 0.15 | 45 | | polyoxyethylene dodecyl phenyl ether | sodium lauryl sulfate | 126° | good | bad |
| | styrene | 10 | 0.20 | 45 | | dioctadecyl sulfide | polyethylene glycol | 135° | good | good |
| | phenol | 10 | 0.20 | 50 | | dioctadecyl sulfide | polyethylene glycol | 140° | good | good |
| | silica | 3 | 0.12 | 70 | | polyoxyethylene octylphenyl ether | polyethylene glycol | 141° | good | good |
| | alumina | 4 | 0.15 | 60 | | polyoxyethylene octylphenyl ether | sodium dodecyl sulfate | 132° | good | bad |
| COMPARATIVE EXAMPLES | acryl | 20 | 0.15 | 30 | | — | — | 120° | bad | bad |
| | acryl | 15 | 0.15 | 40 | | — | — | 119° | bad | bad |
| | acryl | 10 | 0.15 | 45 | | — | — | 124° | bad | bad |

As is evident from Table 1, according to the silver-coated conductive particles of Examples, the contact angle with water was 130 degree or more, the electrical breakdown was not occurred after 500 hours passed, so that the migration can be prevented.

However, regarding Examples 1, 3, 8 and 9, the evaluation of the migration was "good" after 500 hours: but it was "bad" after 800 hours. This evaluation test was carried out under harsh conditions, so it is not obstructed for normal use even though it is "bad" after 800 hours. For example, in a case in which it is used in harsh conditions as temperature of 80° C. and humidity of 95% or in conditions in which higher reliability is necessary, it is desirable to use one that is judged "good" after 800 hours.

In a case in which the water repellent layers are not formed as Comparative Examples, the contact angle with water is small, so it can be understood that humidity is adsorbed and migration is liable to be occurred.

FIG. 1 is a photomicrograph of Example 1; the water repellent layers are evenly formed on the surfaces.

INDUSTRIAL APPLICABILITY

It is applicable as silver-coated conductive particles for anisotropic conductive film, anisotropic conductive paste, isotropic conductive paste and the like used for a liquid crystal display, a touchscreen panel or the like.

The invention claimed is:
1. Silver-coated conductive particles comprising:
spherical base particles, wherein
a tin layer is formed on a surface of each of the spherical base particles,
a silver plating layer is formed on a surface of the tin layer, and
a water repellent layer is coated on a surface of the silver plating layer, said water repellent layer comprising an organic sulfur compound or a surfactant.
2. The silver-coated conductive particles according to claim 1, wherein the silver-coated conductive particles are formed as a molded body by being pressed at a pressure of 14.7 MPa, said molded body having a contact angle with water of 125 degree or more.
3. The silver-coated conductive particles according to claim 1, wherein the organic sulfur compound includes a sulfide compound.
4. The silver-coated conductive particles according to claim 3, wherein the sulfide compound is dialkyl sulfide.
5. The silver-coated conductive particles according to claim 1, wherein the surfactant is polyoxyethylene ethers.
6. The silver-coated conductive particles according to claim 1, wherein each of the conductive particles has a diameter that is 0.5 µm or more and 30 µm or less.
7. The silver-coated conductive particles according to claim 1, wherein the base particles are made of a material selected from the group consisting of acrylic resin, urethane resin, styrene resin, phenolic resin, silica, and alumina.
8. A conductive paste comprising the silver-coated conductive particles according to claim 1.
9. A conductive film comprising the silver-coated conductive particles according to claim 1.

* * * * *